INVENTORS
GEORG BOLLIG ET AL

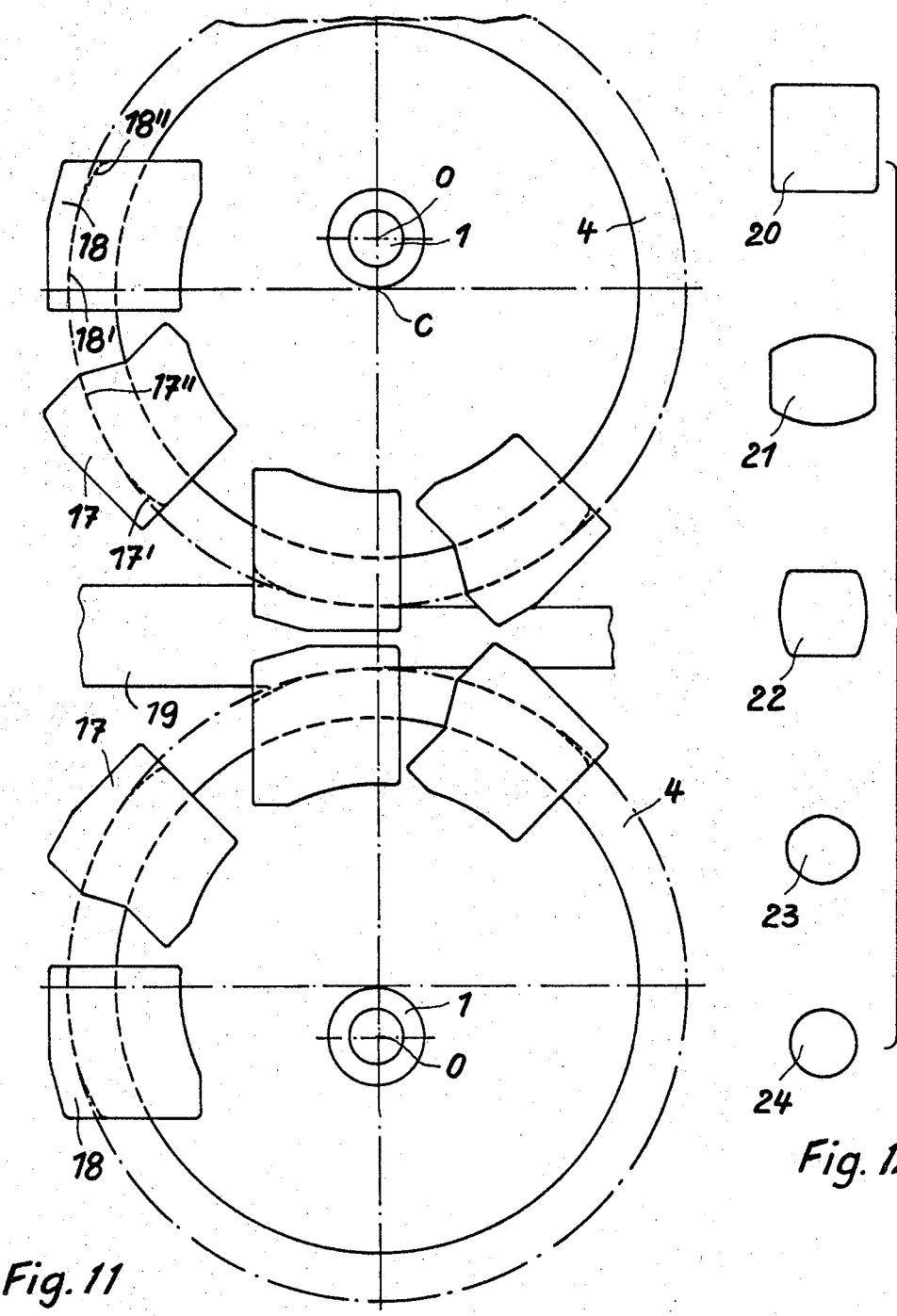

3,557,593
DEVICE FOR FORMING WORKABLE MATERIALS

Georg Bollig, Buderich, near Dusseldorf, Otto Döpper, Krefeld, and Hans Thiemann, Dusseldorf, Germany, assignors to Schloemann Aktiengesellschaft, Dusseldorf, Germany, a German company
Filed Jan. 2, 1969, Ser. No. 788,413
Claims priority, application Germany, Jan. 2, 1968, 1,652,559; Aug. 7, 1968, 1,752,928; Nov. 28, 1968, 1,811,461
Int. Cl. B21b *13/18;* B21j *7/16*
U.S. Cl. 72—190       34 Claims

ABSTRACT OF THE DISCLOSURE

A device for forming material, having two co-operating tool rings with forming sectors which move towards each other to form the material, each tool ring being eccentrically mounted and having a gear which meshes with a gear on an eccentrically-mounted control system, the number of teeth on the gears being related that the material is formed in stages with the effective pair of forming sectors changing after each stage.

---

The invention relates to a device for forming metals and similar workable materials, in which the forming process is effected in stages and the material to be formed is subjected at every stage of the forming process to the effect of driven tools which open and close alternately relatively to each other.

According to the present invention, there is provided a device for forming workable materials, having at least one pair of eccentrically-mounted tool rings, each tool ring having at least two forming sectors and each forming sector being arranged to move towards a corresponding forming sector on the other tool ring or part-ring to form said material, preferably therebetween, and thereby form said material in a number of stages, means for driving each tool ring, a gear associated with each tool ring an eccentrically-mounted second gear having an eccentric centre point different from that of the tool ring and meshing with the first-mentioned gear, and control means for controlling the movement of said second gear, the number of teeth on said second gear being so related to the number of teeth on said first gear that after each forming stage the effective forming sector of the tool ring changes.

As will be described in detail, it is possible to operate the device by means of the second gear and the control means in such a way that there is produced, during the forming operation and in the direction in which the material is conveyed, either no thrust or the degree of thrust desired. In particular it is possible reliably to ensure that the forming sector of the annular tool changes from one stage of the forming process to the next. The thermal stress, which is substantial during relatively slow forming processes and at high working temperatures, thus has a lesser effect on the tool because the tool is cooled after each forming stage.

The tool rings may be tools or may be provided in segments with special forming tools such as pressing plates or grooves.

As will be described in more detail below, the device of the invention can achieve substantial reductions in the cross-section of the material in a single pass so that fewer pairs of working stands (for instance roll stands) need be located in succession, and it is possible to carry out the entire forming process in a single plane at right angles to the direction in which the material to be formed is fed.

In general, it can be said that the device of the invention has two eccentric systems, one of which carries the forming tools and the other of which is controlled by said control means in its rotation about its eccentric centre point and itself controls the rotation of the first eccentric system about its eccentric centre point. Both eccentric systems may be driven by the same shaft.

The tool rings may be in the form of rolls for rolling the material and feeding it forward; in this case, said control means should control the movement of said second gear in such a manner as to produce on the effective roll periphery sector a speed vector in the direction of feed. It is highly desirable that said control means so controls said second gear that the resulting speed vector is greater than the speed at which the material to be formed tends to move backwards in the forming zone as a result of the back pressure produced by deformation. Preferably, said control means so controls said second gear that the rolling curve produced in the material at each stage follows the rolls until the effective sectors are lifted off the material.

There is a particular advantage in providing two pairs of rolls, the axes of which are at right angles to each other as well as at right angles to the direction of feed of the material, the axes advantageously being located in the same plane (which will be at right angles to the direction of feed).

In general, in accordance with the invention, said control means may comprise a lever connected to said second gear, the end of the lever being articulated to a pivoted rocker; the rocker may be adjustable so as to control the resulting speed vector of the effective forming sector.

The device of the invention may be arranged for forging. Forging tools can be arranged in succession on peripheral sectors of the respective tool rings or part-rings, or else may be constituted by the rings or part-rings themselves. During successive forging stages, the rings rotate in a stepped manner so that at each forging stage a different pair of forging tools act upon the material and, after a predetermined rotation, the final pair of forging tools acts upon the material.

When two or more pairs of forging tools are provided, they may be arranged to act upon the material in directions which are perpendicular to one another or at an angle relative to one another which is determined by dividing 180° by the number of pairs of tools; preferably, the pairs of tools act in the same plane perpendicular to the direction of feed of the material.

In order to avoid any forward thrust on the material, the control means can control the device so that the forging tools make no forward movement when they are carrying out the forging operation; nonetheless, the tool rings are preferably driven in the direction in which the material is to be fed, and at least one pair of tool sectors on the tool rings may be so shaped that it can be applied to the material before the forming process commences, so as to be able to convey the material in the direction of feed.

At least two pairs of eccentrically-mounted tool rings may be included, the axes of one pair being at right angles to the axes of the other pair, the forming sectors being in the form of successive passes for forming a rounded cross-section from a rectangular cross-section, the said passes being arranged alternately on the two pairs of tool rings.

The device can be arranged such that the pair of tool rings carrying the first forming sectors acts without thrusting the material forward whilst the pair of tool rings carrying the second forming sectors thrusts the material forward.

When four successive passes are used, the first and third passes may be located on a pair of tool rings having no thrust while the pair of tool rings carrying the second and fourth passes may be controlled so as to exert a thrust on the material in the direction of feed. In this way, it is possible to transform a rectangular cross-section into a rounded cross-section in a smaller amount of space and using only four passes or forming movements, without any overlap and any other defects which may occur during rolling.

Preferably, the directions of action of the passes are in the same plane, perpendicular to the direction of feed of the material.

In each pair of tool rings, the tool ring and the pertinent second gear are preferably arranged to rotate about the same drive shaft axis.

In order to take full advantage from the tool ring, each tool ring may have 8 passes (e.g. grooves), the number of teeth on said first gear and on said second gear being in the ratio $1:(1+\frac{1}{8})$.

The surfaces of the base of the pass of each pair of tool rings may have, in the region adjacent the output side, a distance from the centre point of the tool ring concerned which increases with each successive pass, whereas at the input side the distance from the centre point may decrease with each successive pass.

The invention will be further described, by way of example, with reference to the accompanying drawings, which illustrate particular embodiments thereof and in which:

FIG. 11 shows a pair of annular tools with grooves or passes;

FIG. 12 shows the various cross-sectional shapes and sizes obtained at each forming stage;

Figure 1:
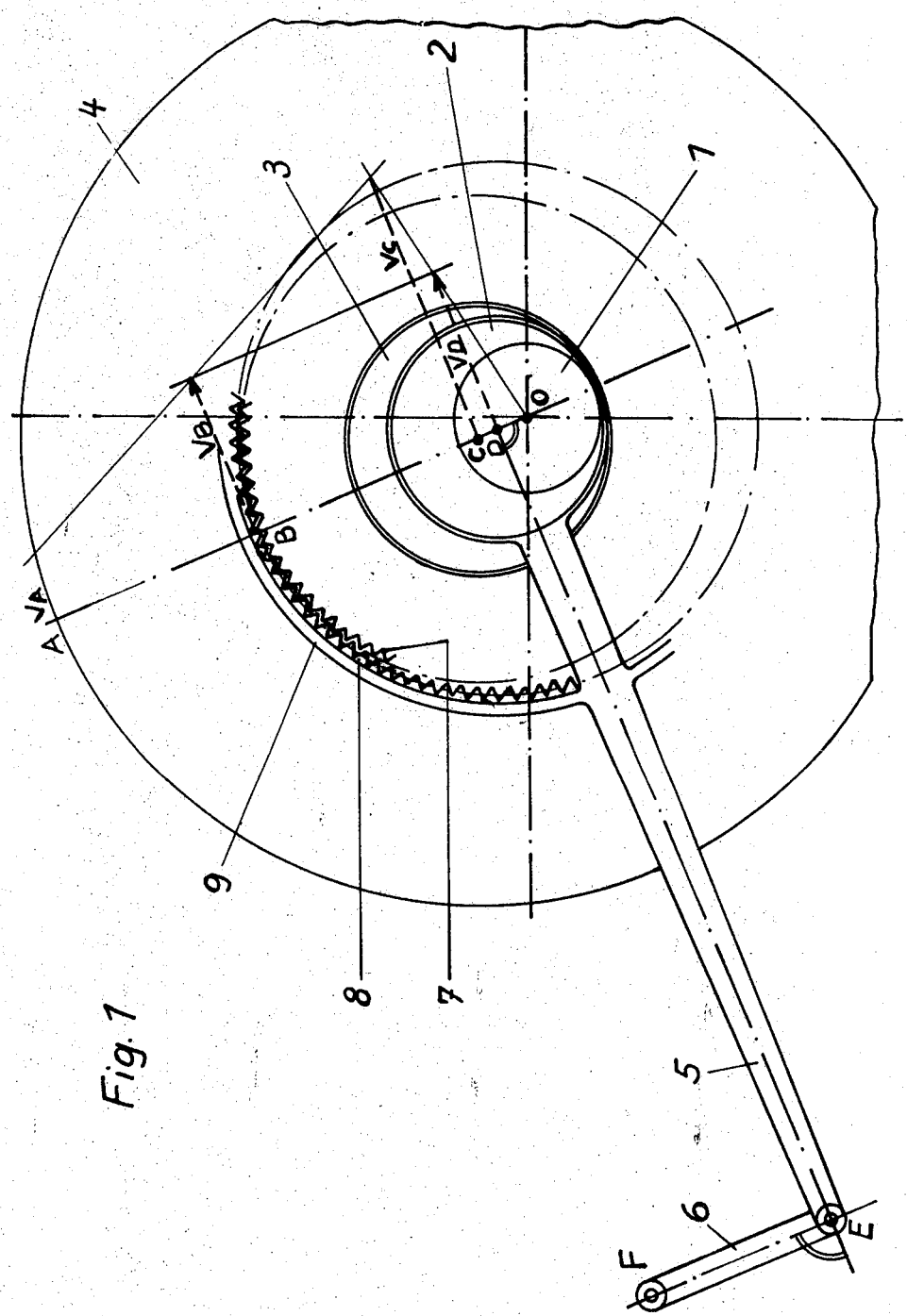
FIG. 1 shows the arrangement of the two eccentric systems in a device in accordance with the invention.

As shown in FIG. 1, two eccentrics 2 and 3 are driven by a shaft 1 having an axis O, the eccentric 2 forming part of an externally controlled eccentric system while the eccentric 3 constitutes part of an eccentric system which carries a rolling ring 4. The externally controlled eccentric system has an eccentric centre point D while the eccentric system which carries the rolling ring has an eccentric centre point C. The externally controlled eccentric system is controlled by means of a lever 5 secured thereto, one end of which is articulated to a rocker 6 mounted in a stand frame not shown in the drawing. The eccentric system which carries the rolling ring 4 is connected to external gearing 7 extending concentrically therewith and having a smaller diameter, while the externally controlled eccentric system has internal gearing 8 which meshes with the external gearing 7 on the rolling ring 4. The internal gearing 8 is shown diagrammatically on an annular curve 9 connected to the lever 5. In a variant of this embodiment, the externally controlled eccentric system may be controlled by any suitable means, for instance by a driven pinion.

Figure 2:
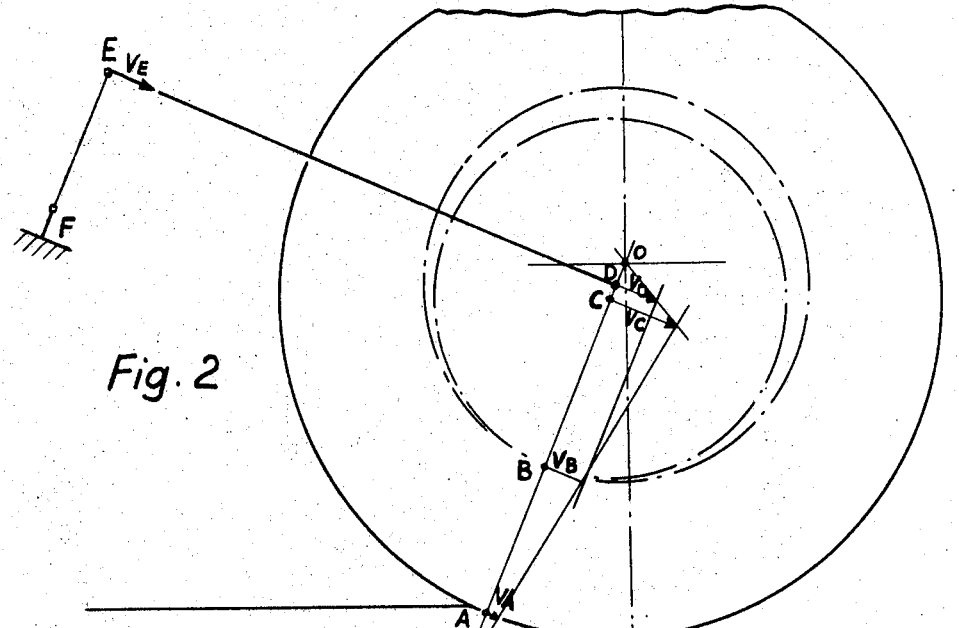
FIG. 2 is a speed diagram for one setting of the control for the externally controlled eccentric system.

The meshing pinions shown in the drawing are thus driven by the same shaft 1 with differing eccentricity. Thus the eccentric centre points C and D are also driven at differing speeds. The speed of the eccentric centre point D is expressed as the vector $V_D$. It is transmitted positively to the point of mesh B and thus causes the externally controlled eccentric system with the control system comprising the lever 5 and the rocker 6 to be moved in parallel in the direction of the speed vectors shown. Throughout a sufficiently large angle of rotation of the driven shaft 1, the lever 5 is simply shifted in parallel whereas when the shaft 1 effects a full rotation it is moved at least approximately in parallel. The speed vector $V_A$ which acts on the periphery of the rolling ring at point A is obtained by intersecting an extension of the lines drawn through points O, D, C, and B and the line connecting the speed vectors of points C and B, viz, $V_C$ and $V_B$. The desired speed components on the external diameter of the rolling ring are obtained by drawing the perpendicular on the extension of the line, O, D, C, B at point A. This perpendicular determines the speed vector $V_A$ by its point of intersection with the line connecting the speed vectors $V_C$ and $V_B$. The starting pole of the rolling ring 4 is, as is shown particularly clearly in FIG. 2, outside the section O–A.

Figure 3:
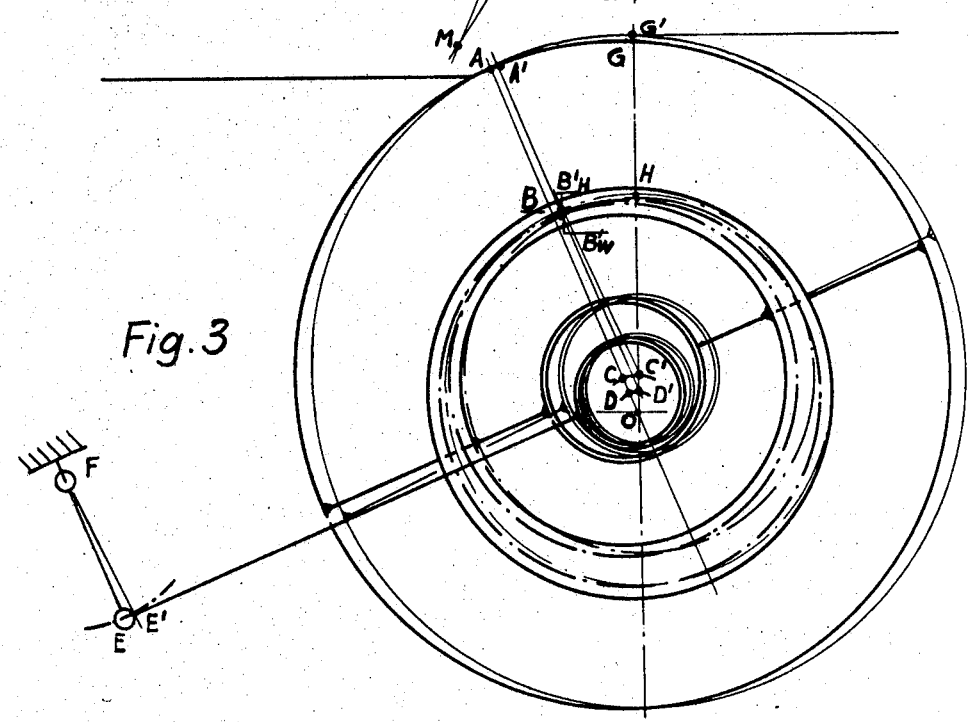
FIG. 3 is a directional sketch for FIG. 2.

The directional sketch given in FIG. 3 shows in thick lines the rolling ring, the eccentric, the gearing, the lever and its associated rocker in one position during the rolling operation. The thin lines indicate the position of these same elements after some rotation of the eccentric shaft and thus a shifting of the eccentric centre point from C to C'.

The centre point D of the eccentric controlled by the lever system is located on the line joining O and C. The axis of the lever E–D is perpendicular to O–D. The axis of the rocker E–F is almost perpendicular to E–D.

Since the distance between the two eccentric centre points C–D is the same as the distance between the two sets of gearing, the point of mesh B is located on the extension of O–D–C. B is in this case a point of the gearing on the lever 5 and at the same time a point on the gearing on the rolling ring 4. A is the point on the rolling ring 4 in the extension of O–C–B as already mentioned.

The shift of the point A during rolling occurs as the shaft 1 rotates about O with the shift in the eccentric centre point from C–C'. D similarly rotates about O to D' while E shifts to E'. The point of mesh shifts from B to H while the points determined from the initial position of the point of mesh B on the gearing shift to $B'_H$ or $B'_W$.

Since the point A is located on the straight line C–B and C and B are fixed points of the eccentric system which carries the rolling ring, A' must lie on the line $C'B'_W$. Thus we have found the desired rotation of the point A during rotation of the shaft 1 to be from C to C'. The shift in the rolling ring 4 in the abutment surface is thus slight, but, as FIG. 5 shows, it is possible, by shifting the rocker bearing F, to influence the shift in the point of abutment A for the same rotation of the shaft 1 about O. To this end F was shifted to X (see FIG. 4). Thus the rocker E X is no longer approximately vertical to ED, so that when the shaft 1 rotates and shifts from C to C', the lever ED does not only effect a movement substantially parallel to its axis but shifts it in rotation for a slight distance D. This leads to a greater shift in the point B on the gearing in the lever-controlled eccentric system from B to $B'_H$ and thus through the meshing also leads to a greater movement of the point B on the gearing of the eccentric system carrying the rolling ring 4 from B to $B'_W$, which in turn results in an increase in the shift of the point A on the line CB to A'. Thus by shifting the point of articulation of the rocker 6 it is possible to increase the shift in the point of abutment A for the same rotation of the shaft 1.

Figure 4:
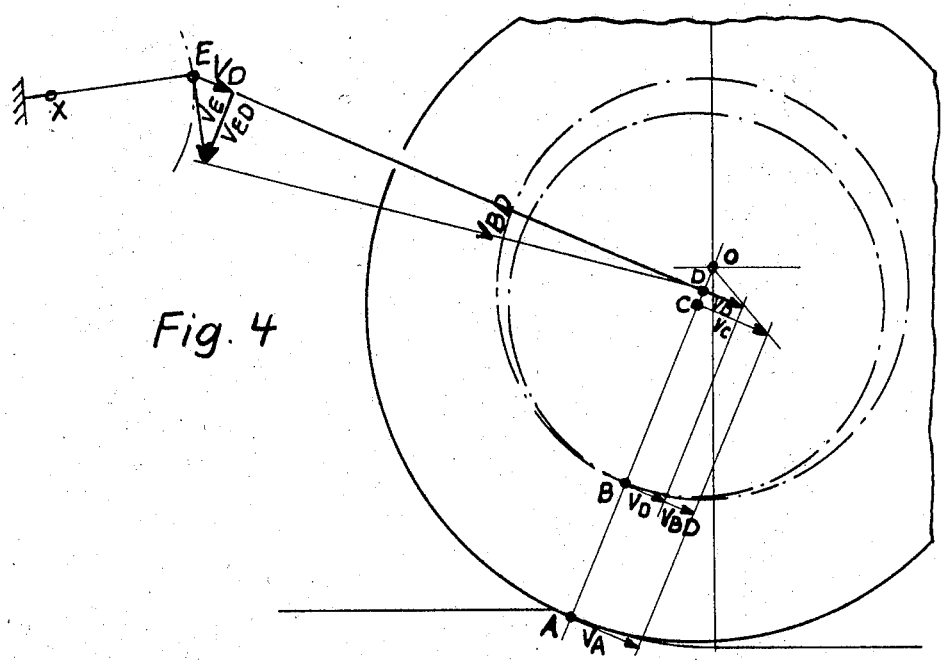
FIG. 4 is a speed diagram for a different adjustment of the control.
Figure 5:
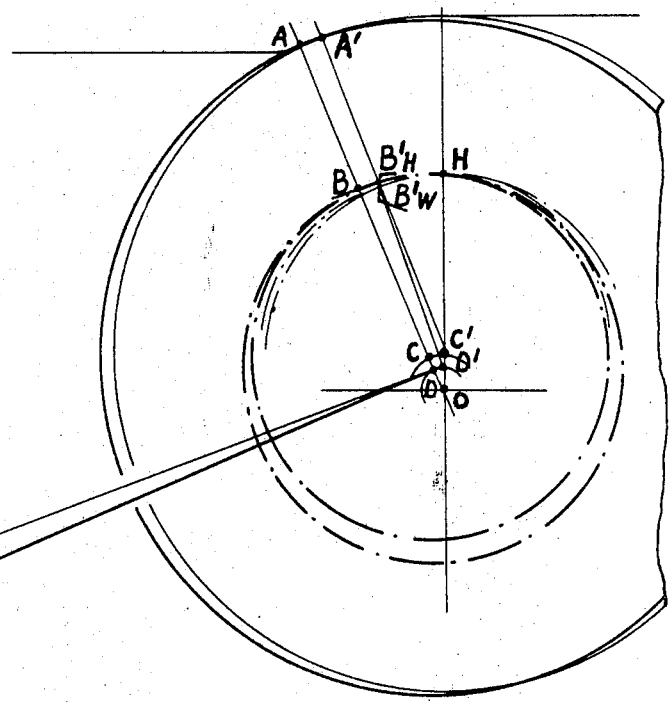
FIG. 5 is a directional sketch for FIG. 4.

The directional sketch referred to above relates to the speed diagram given in FIG. 4. By shifting F to X and thus moving the rocker 6 out of its position perpendicular to the axis of the lever 5, the speed $V_D$ of the point D is only equal to the momentary speed component of $V_E$ in the direction of $V_D$. Since, however, the direction of $V_E$ is known and a component of $V_E$ is identical in direction and size with $V_D$, $V_E$ is also known. As may be seen, the second speed component of $V_E$ is, like $V_{EB}$, a momentary rotational speed of the lever 5 about the point D, so that the momentary speed of the lever 5 about D on the radius of the gearing 8 connected therewith is seen to be $V_{BD}$. The speed of the point B is thus determined from two components, one of which is the momentary speed $V_D$ and the other the momentary speed $V_{BD}$ about D. Since we thus know again two speeds of the rolling ring 4, viz, that of the centre point C to be equal to $V_C$ and that of the external gearing 7 connected thereto at B to be equal to $V_D + V_{BD}$, the speed $V_A$ is also known, since it can be discovered in the manner described in connection with FIG. 1.

Figure 6:
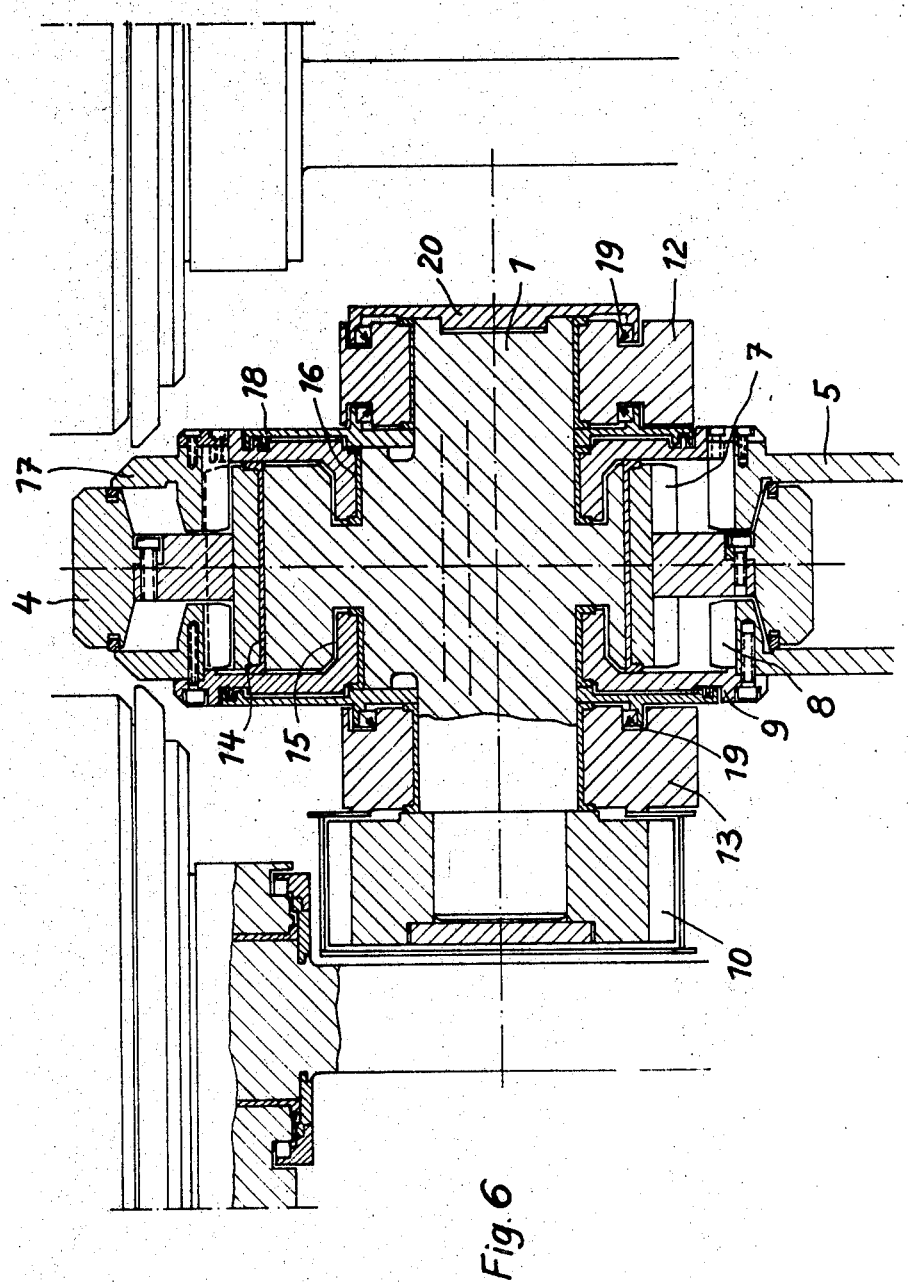
FIG. 6 is a longitudinal section through an embodiment of the invention.
Figure 7:
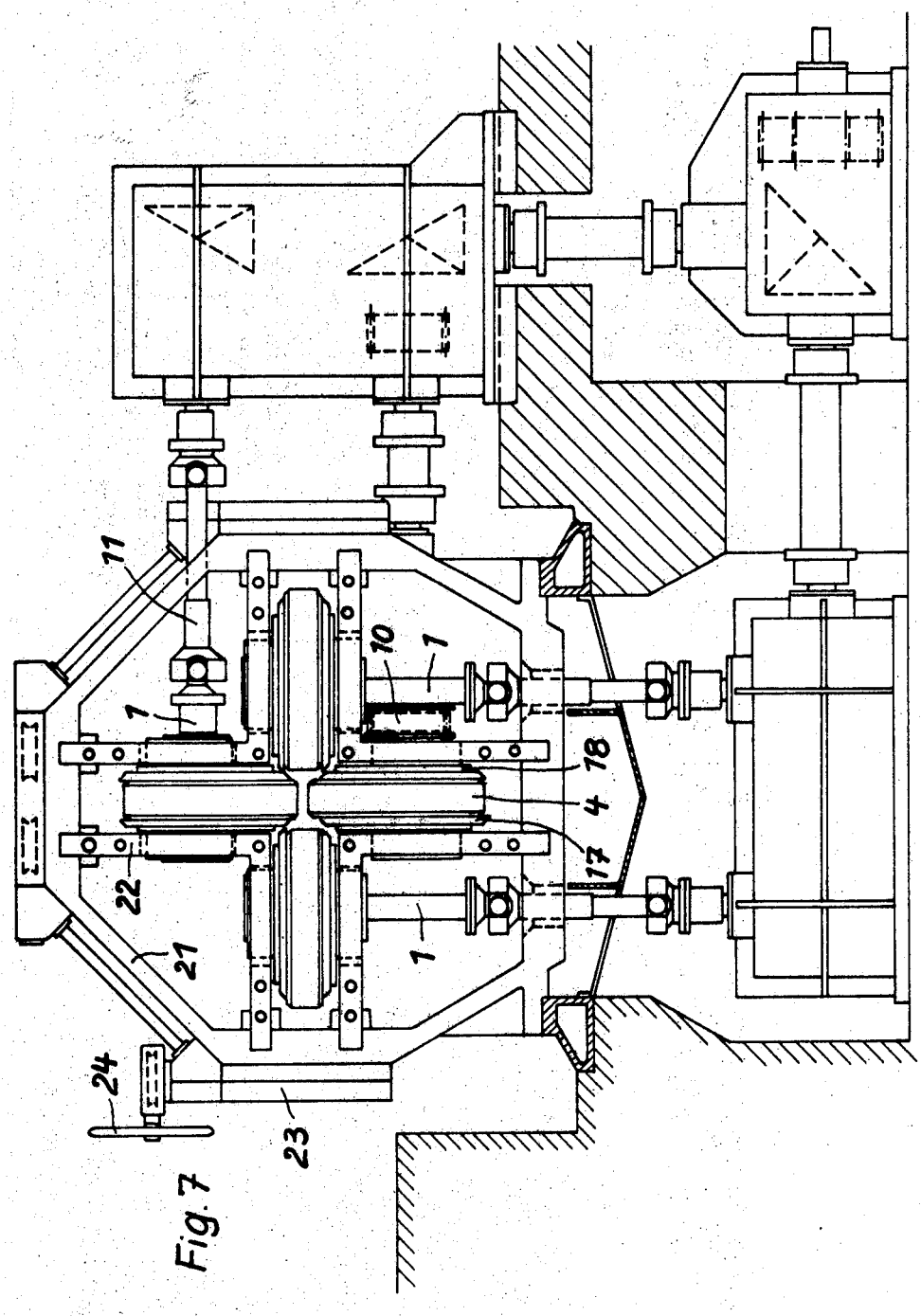
FIG. 7 is a plan view in the direction of feed of a roll stand comprising two devices in accordance with the invention.
Figure 8:
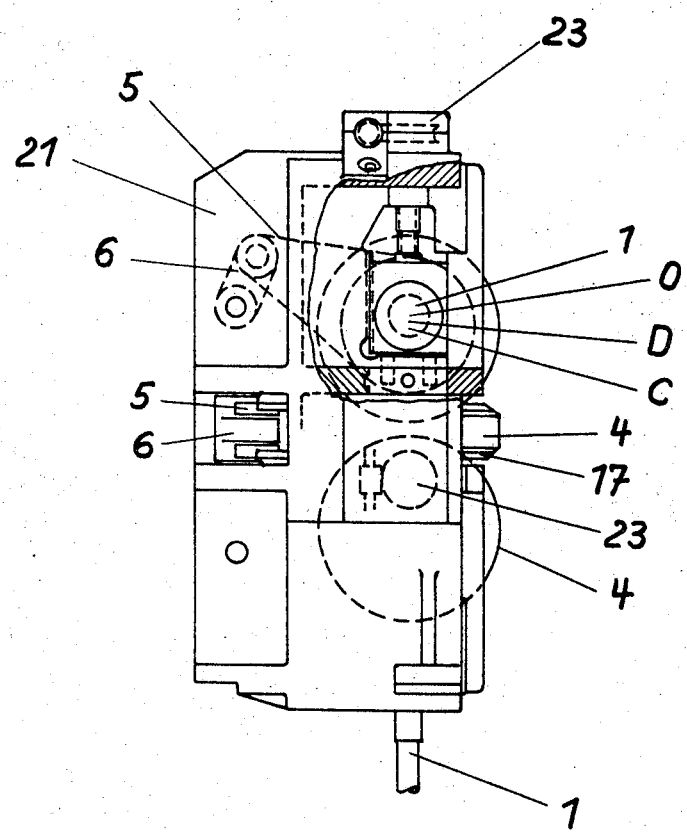
FIG. 8 is a part-sectional side view of the stand shown in FIG. 7.

It is thus possible, by varying the control of the controlled eccentric system, to influence the movement of the rolling ring 4 in such a manner that the momentary speed at the point of abutment on the rolled stock may be varied and adjusted to the creep occurring during rolling. The embodiment shown in FIGS. 6 to 8 shows a shaft 1 which is driven through a pinion 10, cardan shafts 11 or the like, and which has a disc-shaped portion between its bearings 12 and 13. On the periphery of the disc-shaped portion there is located a bearing bush 14 for the rolling ring 4 or for its external gearing 7. In addition, an annular groove 15 is provided in the disc-shaped portion of the shaft 1 with the same eccentricity as the externally driven eccentric system; a further bearing bush 16 is provided in the annular groove 15 for the pertinent eccentric system which has the internal gearing 8. This internal gearing 8 is connected to the curve 9 (see FIG. 1) to which is secured the lever 5 constituting part of the control system. Sealing discs 17 and 18 serve to close the sides of the two eccentric systems. The bearings 12 and 13 are sealed to the disc 18 and a cover 20 by means of seals 19. As shown particularly in FIG. 7, the arrangement of two pairs of rolls in a plane extending at right angles to the direction of feed does not present any difficulty from the constructional point of view. The bearing mountings 22 are secured in the stand frame 21. In addition, the frame 21 contains a screw down mechanism 23 for adjustment using a wheel 24. The drive for the individual shafts 1 is effected by means such as the cardan shafts 11 described above or of the pinion 10, through a bevel gear system which is not specified in any further detail.

The embodiment described makes it possible to achieve a reduction from 230 mm. to 80 mm. square cross-section in a single pass. The input speed in this case is a maximum of 0.0665 metre per sec. and the output speed a maximum of 0.55 metre per sec. The elongation achieved is 8.3:1 and the thrust per pass is 20 mm.

The shaft 1 rotates at a speed of 200 r.p.m. The driving torque per roll is 4 mt., the rolling pressure is 250 tons and the overall driving power 850 kw.

Where suitable, the drive shaft for a tool ring may in general have a disc-shaped portion carrying a bearing for the tool ring and carrying another bearing for gearing (said second gear) of the control system.

In a variant of the embodiment illustrated, a number of further problems connected with forming can be solved above-average reductions per pass can be achieved as well as other advantages which are described in more detail below.

Figure 9:
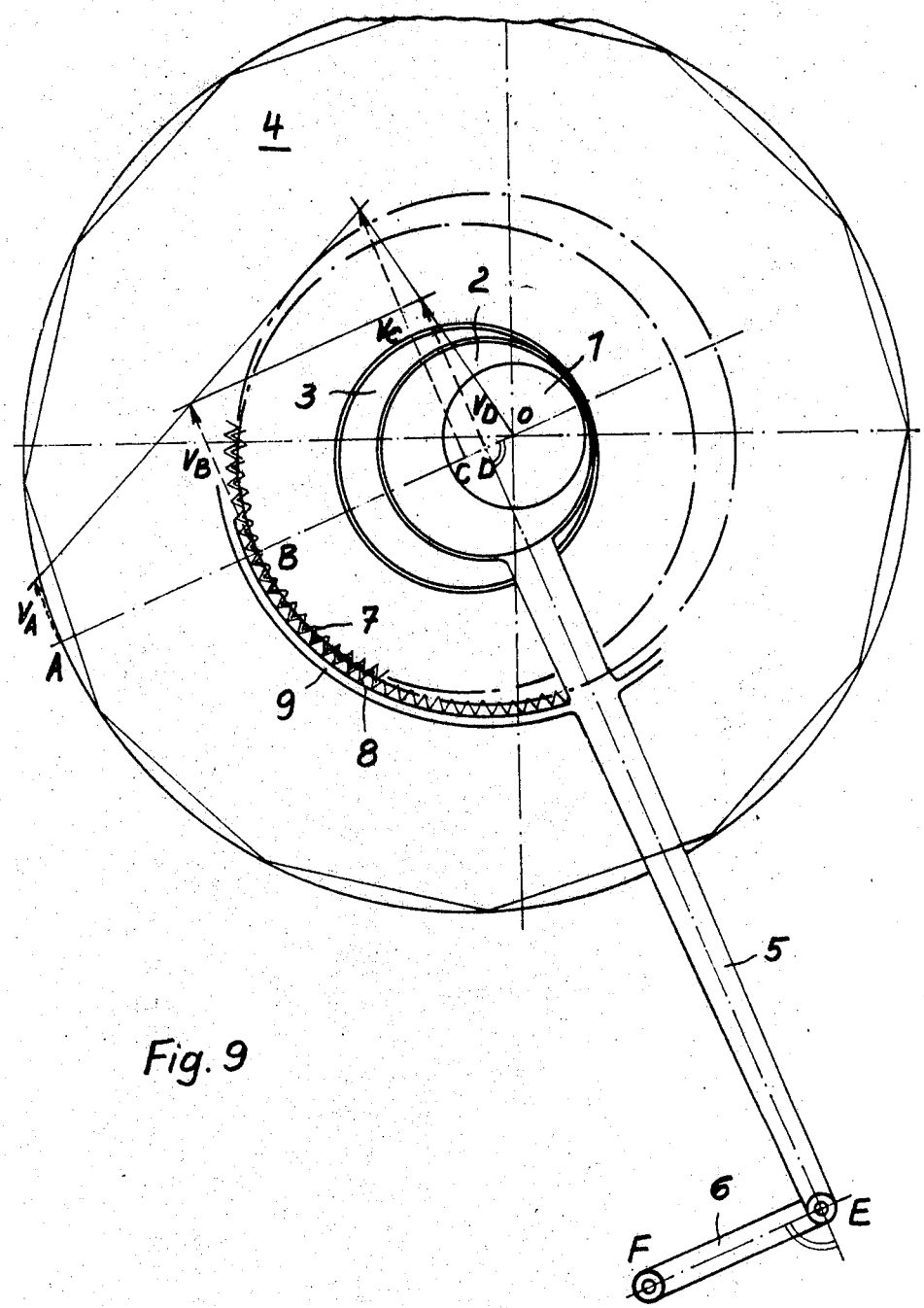
FIG. 9 shows another embodiment of the invention, designed for forging.

Thus, FIG. 9 shows a similar eccentric system in which the tool ring 4 is provided on its periphery with individual segments which may be used for forging. The movement of the tools is as described in connection with FIG. 1 and following figures. The direction of speed of $V_A$ is here of greater importance in that it enables a force which acts during the forming process against the direction of feed of the material being forged to be counteracted and, when the appropriate peripheral sections or segments of the tool ring are acting upon the material being forged, causes the material to be fed forward.

Figure 10:
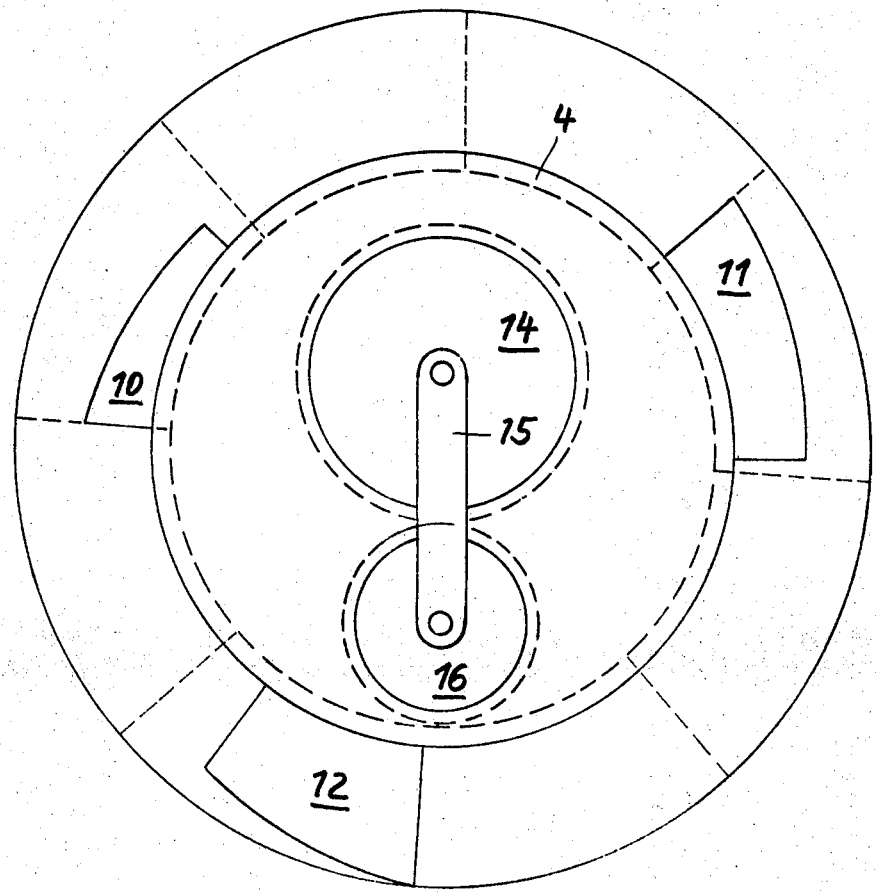
FIG. 10 shows a variant of the eccentric system.

As shown in FIG. 10, the tool ring 4 is equipped with three tools (segments) 10, 11, 12 which acts on the material in that order. Such tools may be arranged on the tool ring 4 so as to be replaceable, so that the tool ring may be used for different types of forming. The order of use of the various tools as given, or any other order, or any other feed sectors which are not shown in the figure for the sake of clarity, may be achieved by transmission within the planet gear. The sun wheel 14 of the planet gear system is fixed while the strut 15 transmits the drive. The planet pinion 16 meshes with the internal gearing on the tool ring 4. In order to achieve an even drive, it is possible to provide a further planet pinion opposite, for example, the pinion 16 and to mount it in the strut 15, which is extended accordingly, in the same way as the planet pinion 16.

In the embodiment shown, it is now the ratio of the teeth in the tool ring 4 and the sun wheel 14 which determines after how many rotations of the strut 15 one of the sectors, of which eight are shown in chain-dotted lines in the drawing, will return to its initial position. For one rotation of the strut 15 we then obtain a rotation which is equal to the value of the ratio (1 + number of teeth on the sun wheel)/(number of teeth on the tool ring). This latter ratio must, therefore, if we are to retain the sequence 10, 11, 12 in the present case, be ⅝. The transmission ratio range, which is in itself limited, may be fairly substantially extended by using transmission ring gears in association with the planet pinion 16. The working surfaces of the forming tools are, as the drawing shows, advantageously given an inclination so that in spite of the eccentricity it is possible to achieve an even pressure on the material.

Since according to the invention it is not necessarily successive tools which act on the material during successive forming stages, a point which is illustrated particularly by this last embodiment, there is no difficulty about achieving an equal distribution of the heat which occurs in the annular tool during very slow forging or pressing processes. This is achieved, for example, by selecting an arrangement of the tools and a transmission ratio such that the opposite point always acts on the material in successive stages. Moreover, the idle rotation of the tool ring 4 also causes acceleration forces to become absorbed and used to advantage in the following stage by slowing down the forming work. Tools and drive systems are thus easier to choose than would be the case in a pure rolling process.

The forming device of the invention also permits the use of successive passes or grooves which allows of a forming process midway between pressing and rolling. An arrangement of this type is shown in FIG. 11. The eccentric systems which are driven and move in the manner already described above, are only shown diagrammatically. The tool rings 4 in a pair of such tool rings are seen to rotate, in a controlled manner, about the axis O of the eccentric shaft 1 in the manner of the invention. Control may here be effected by means of the lever 5 already mentioned. The eccentric system associated with the tool ring 4 has the eccentric centre point C.

A further pair of tool rings is located in a plane at right angles to the plane of the drawing but is not shown. While the tool rings shown in the drawing are controlled in the manner described so that there is little or no thrust during the forming strokes or passes, the pair of tool rings which act at right angles thereto is controlled by means of its pushrod control system in such a manner that the forming strokes also effect a forward feed thrust.

The pair of tool rings 4 is provided on its outer periphery with forming tools which alternate and take the form of two different grooves or passes. In the same way, the pair of tool rings arranged at right angles to the plane of the drawing but not shown are provided with alternating segment-shaped tools. The pairs of tool rings work alternately on the material, the material 19, which is initially square in shape, first being subjected to the action of the pass 17 in the pair of tool rings shown. The square cross-sectional shape shown in FIG. 12 at 20 is thus transformed to the cross-section shape 21. There is no forward thrust during this operation. Subsequently, the second pair of tool rings with the second groove acts in FIG. 11 perpendicularly to the plane of the drawing on the material 19 to be formed and transforms the cross-sectional shape 21 into 22 while effecting a forward thrust. The next forming stroke or pass is now again effected by the pair of tool rings shown in FIG. 11, which this time use the groove 18 to achieve the cross-sectional shape 23 without forward thrust. Finally the material with a cross-sectional shape which is now substantially round, is subjected to the final forming stroke or pass by the pair of tool rings acting perpendicular to the plane of FIG. 11 and is given the fully rounded cross-section 24 while being thrust forward. A new series of passes then commences.

The increasing reduction in the cross-section is matched in that the surfaces of the base of the grooves in the output section 17' or 18' are located at an increasing distance from the centre point C of the respective pair of tool rings 4, while in the input side, the sections 17" and 18" have, in the order of the passes, a decreasing distance from the centre point C of the respective tool ring 4.

Figure 13:
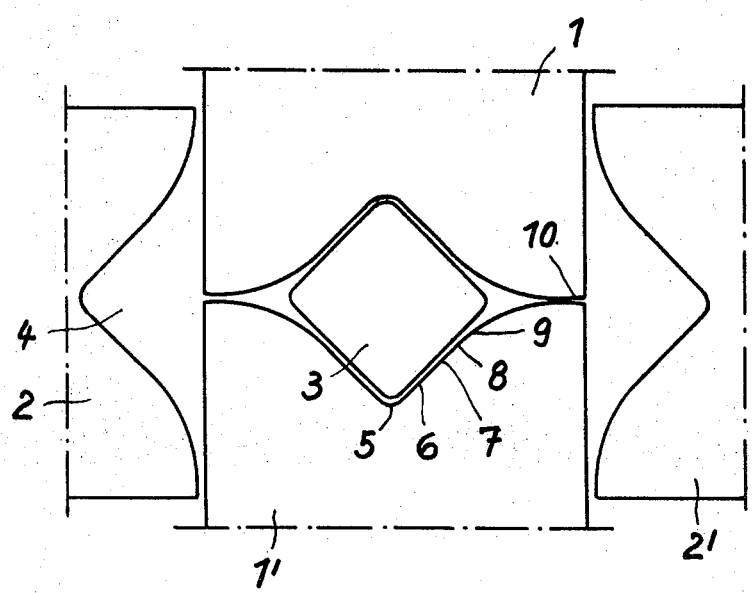
FIG. 13 is a schematic view in the direction of feed of part of yet another embodiment of the invention.
Figure 14:
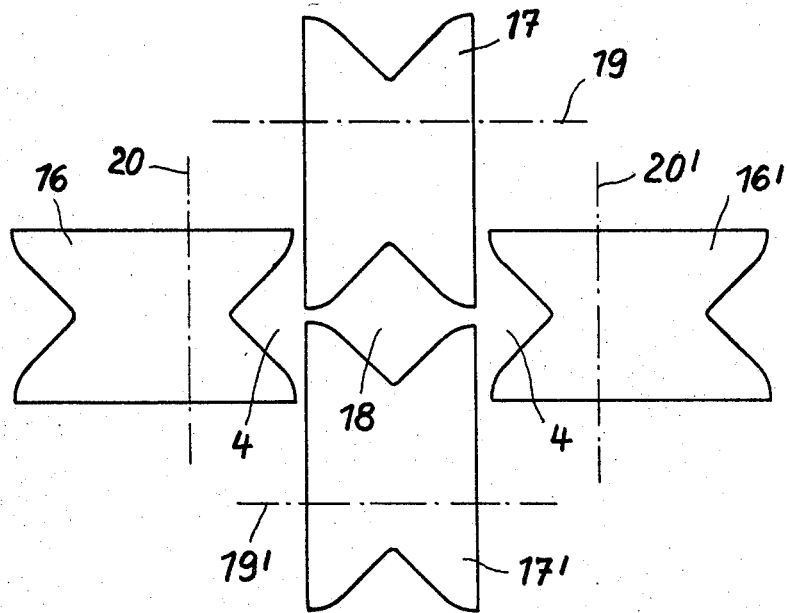
FIG. 14 is a view of the embodiment of FIG. 13, specifically showing rolls as the operative tools.

In the embodiment of FIGS. 13 and 14, both pairs of tools 31, 31' and 32, 32' engage alternately with the material 33 and are suitably installed in a single plane. Each tool has a profile 34 which forms half of a pass or caliber. The deepest point of the caliber can be rounded off, as at 35. Connected to this rounding off, the side faces 36 are inclined to each other at an angle of about 90°. The side faces are rectilinear from the rounding off 35 to at least the mid-depth 37 of the caliber. Suitably, the rectilinear part of each side face 36 extends a little bit beyond the mid-depth 37 and then, beginning at the point 38, merges into a widening edge zone 40 with a curved surface 39. In this, it is important that there is a precise register of the two pairs of calibers in the zone between the point 37 and the point 38, in the manner described above; this can be determined graphically if both pairs of tools 31, 31' and 32, 32' are depicted in their closed positions. In this way, the formation of sharp edges on changing from one pair of tools to the following pair is prevented.

The arrangement shown in FIG. 13 is general in nature. However the tool rings shown in FIG. 14 are rolls and are arranged to feed the material forwards during their eccentric drive. The pairs of rolls 46, 46' and 47, 47' have the profile 34 described above so that when a pair of rolls is closed, it forms a pass 48. When the pair of rolls 47, 47' (having driving shafts 49, 49') is just about to reach its closed position, the pair of rolls 46, 46' (having driving shafts 50, 50') is in its open position.

In the embodiment of FIGS. 13 and 14, the pairs of tools are at right angles to each other and engage the material in succession. If however the tools are arranged following one another in the direction of feed, it is possible for both pairs of tools to engage the workpiece simultaneously. As it permits the attainment of unusually high reductions, the use of the caliber pass is then suitable if the required cross-section is to be obtained with only one pass or few passes.

Thus in further constructions, the invention can enable articles such as bars of generally four-sided cross-section to be formed, whilst avoiding flashes, burrs, overlaps, laminations and such defects. For this purpose, the profile of each said forming sector may have edge zones and a generally V-shaped groove, said groove being defined by a bottom portion and two sides inclined at about 90° to each other, which sides run rectilinearly from the groove bottom portion at least to the mid-depth of the groove and join the edge zones of the forming sector. It is particularly advantageous if said sides of said groove curve into said edge zones. The curved portions may have their outer edge portions running asymptotically into the rectilinear edge zones of the forming sector. In this way, bars can be formed whose cross-sections have slightly rounded edges corresponding to the slight rounding of the bottom of the groove in the forming sector; such bars are substantially more suitable for further forming processes. The rectilinearity of the sides of the groove at least to their mid-depth ensures that the forming sectors which come one after the other together form a closed pass or caliber whose joins run in two mutually perpendicular planes, the joins corresponding to the gaps between the two pairs of forming sectors. An overlap of the forming sectors is obtained on the side faces, avoiding all surface defects on the bar sides such as lamination effects or the like which result from sharp edged joints.

We claim:

1. A device for forming workable materials, having at least one pair of eccentrically-mounted tool rings, each tool ring having at least two forming sectors and each forming sector being arranged to move towards a corresponding forming sector on the other tool ring to form said material therebetween, means for driving each tool ring, a gear associated with each tool ring, an eccentrically-mounted second gear having an eccentric centre point different from that of the tool ring and meshing with the first-mentioned gear, and control means for controlling the movement of said second gear, the number of teeth on said second gear being so related to the number of teeth on said first gear that after each forming stage the effective forming sector of the tool ring changes.

2. A device as claimed in claim 1, wherein the effective forming sector has a speed vector in the direction of feed.

3. A device as claimed in claim 1, wherein the effective forming sector has no speed vector.

4. A device for forming workable materials, having at least one pair of eccentrically-mounted rolls for forming the material and feeding it forward, sectors of each roll periphery being arranged to move towards corresponding sectors of the other roll periphery to form said material therebetween, means for driving each roll periphery in the direction in which said material is to be fed, a gear associated with each roll, an eccentrically-mounted second gear having an eccentric centre point different from that of the roll and meshing with the first-mentioned gear, and control means for controlling the movement of said second gear in such a manner as to produce on the effective roll periphery sector a speed vector in the direction of feed, the number of teeth on said second gear being so related to the number of teeth on said first gear that after each forming stage the effective forming sector of the roll periphery changes.

5. A device as claimed in claim 4, and including at least two drive shafts, each drive shaft driving a roll together with its associated said first gear as well as said second gear, said roll and said second gear having different eccentric centre points.

6. A device as claimed in claim 4, wherein said control means so controls said second gear that the resulting speed vector on the effective roll periphery sector is greater than the speed at which the material to be formed tends to move backwards in the forming zone as a result of the back pressure produced by deformation.

7. A device as claimed in claim 4, wherein said control means so controls said second gear that the rolling curve produced in the material at each stage follows the rolls until the effective sectors are lifted off the material.

8. A device as claimed in claim 4, wherein two pairs of rolls are provided, the axes of which are at right angles to each other as well as at right angles to the direction of feed of the material.

9. A device as claimed in claim 8, wherein the two pairs of roll axes lie in the same plane.

10. A device as claimed in claim 4, wherein said control means comprises a lever connected to said second gear, the end of the lever being articulated to a pivoted rocker.

11. A device as claimed in claim 10, wherein the rocker is adjustable so as to control the resulting speed vector of the effective forming sector of the roll.

12. A device as claimed in claim 4, wherein the roll is connected to external gearing concentric therewith and having a smaller diameter than the roll, while said second gear has internal gearing which meshes with the external gearing on the roll.

13. A device as claimed in claim 5, wherein the shaft has a disc-shaped portion provided on its external periphery with a bearing carrying the roll and provided with a second bearing which is located in an annular groove in the disc-shaped portion with the same eccentricity as that of said second gear, for carrying said second gear.

14. A device for forging workable materials, having at least one pair of eccentrically-mounted tool rings,
forging tools arranged in succession on or as peripheral sectors of the respective tool ring, each said forging tool being arranged to move towards a corresponding forging tool on the other tool ring to forge said material therebetween,
means for driving each tool ring,
a gear associated with each tool ring,
an eccentrically-mounted second gear having an eccentric point different from that of the tool ring and meshing with the first-mentioned gear, and
control means for controlling the movement of said second gear,
the number of teeth on said second gear being so related to the number of teeth on said first gear that after each forging stage the effective forging tool changes so that at each forging stage a different pair of forging tools acts upon the material.

15. A device as claimed in claim 14, wherein two pairs of rings are provided and are arranged to act upon the material in directions which are perepndicular to one another.

16. A device as claimed in claim 14, wherein a number of pairs of rings are provided and are arranged to act upon said material at an angle relative to one another which is determined by dividing 180° by the number of pairs of rings.

17. A device as claimed in claim 16, wherein the pairs of forging tools act in the same plane perpendicular to the direction of feed of the material.

18. A device as claimed in claim 14, wherein the forging tools make no forward movement when carrying out the forging operation.

19. A device as claimed in claim 14, wherein at least one pair of forging tools on the tool rings is so shaped that it can be applied to the material before the forming process commences, so as to be able to convey the material in the direction of feed.

20. A device as claimed in claim 14, wherein the number of teeth of said second gear is so related to the number of teeth on said first gear that after a predetermined rotation of the tool ring a pair of forging tools which initiates the sequence of forging stages is brought into contact with the material to be formed.

21. A device as claimed in claim 14, wherein the tool ring with said first gear and said second gear rotate about the same shaft axis.

22. A device for forming workable materials, having at least two pairs of eccentrically-mounted tool rings, the axes of one pair being at right angles to the axes of the other pair, each tool ring having a forming sector which is arranged to move towards a corresponding forming sector on the other tool ring to form said material therebetween, and thereby form said material in a number of stages, the forming sectors being in the form of successive passes for forming a rounded cross-section from a rectangular cross-section, the said passes being arranged alternately on the two pairs of tool rings,
means for driving each tool ring,
a gear associated with each tool ring,
an eccentrically-mounted second gear having an eccentric centre point different from that of the tool ring and meshing with the first-mentioned gear, and
control means for controlling the movement of said second gear whereby the pair of tool rings carrying the first forming sectors acts without thrusting the material forward and the pair of tool rings carrying the second forming sectors feeds the material forward,
the number of teeth on said second gear being so related to the number of teeth on said first gear that after each forming stage the effective forming sector of the tool ring changes.

23. A device as claimed in claim 22, wherein the directions of action of the passes are in the same plane perpendicular to the direction of feed of the material.

24. A device as claimed in claim 22, wherein for each pair of tool rings, the tool ring and the pertinent second gear are arranged to rotate about the same drive shaft axis.

25. A device as claimed in claim 22, wherein each tool ring has eight passes, the number of teeth on said first gear and on said second gear being in the ratio of $1:(1+\frac{1}{8})$.

26. A device as claimed in claim 22, wherein the surfaces of the base of the pass of each pair of tool rings have, in the region adjacent the output side, a distance from the centre point of the tool ring concerned which increases with each successive pass, whereas at the input side the distance from the centre point decreases with each successive pass.

27. A device as claimed in claim 14, wherein the said control means includes a push rod.

28. A device as claimed in claim 22, wherein the said control means includes a push rod.

29. A device for forming workable materials, having at least two pairs of eccentrically-mounted tool rings, the axes of one pair being at right angles to the axes of the other pair, each tool ring having a forming sector which is arranged to move towards a corresponding forming sector on the other tool ring to form said material discontinuously therebetween, and thereby form said material in a number of stages, the forming sectors being in the form of successive passes for forming a four-sided cross-section, the profile of each said forming sector having edge zones and a generally V-shaped groove, said groove being defined by a groove bottom portion and two sides inclined at about 90° to each other which sides run rectilinearly from the groove bottom portion at least to the mid-depth of the groove and join the edge zones of the forming sector,
means for driving each tool ring,
a gear associated with each tool ring,
an eccentrically-mounted second gear having an eccentric centre point different from that of the tool ring and meshing with the first-mentioned gear, and
control means for controlling the movement of said second gear,
the number of teeth on said second gear being so related to the number of teeth on said first gear that after each forming stage the effective forming sector of the tool ring changes.

30. A device as claimed in claim 29, wherein said sides of said groove curve into said edge zones.

31. A device as claimed in claim 29, wherein said forming sectors are arranged to roll on said material.

32. A device as claimed in claim 29, wherein said driving means drive the tool rings in the direction of feed.

33. A device as claimed in claim 32, wherein the effective forming sectors make a forward movement when carrying out the forming operation.

34. A device as claimed in claim 1, and including at least two drive shafts, each drive shaft having a tool ring together with its associated said first gear as well as said second gear, said tool ring and said second gear having different eccentric centre points, and each shaft having a disc-shaped portion provided on its external periphery with a bearing carrying the too ring and provided with a second bearing which is located in an annular groove in the disc-shaped portion with the same eccentricity as that of said second gear, for carrying said second gear.

References Cited

UNITED STATES PATENTS

| | | | |
|---|---|---|---|
| 3,402,585 | 9/1968 | Holum | 72—449 |
| 3,439,519 | 4/1969 | Gerding | 72—189 |

LOWELL A. LARSON, Primary Examiner

U.S. Cl. X.R.

72—215; 240; 449